(12) United States Patent
Barr et al.

(10) Patent No.: US 8,867,122 B2
(45) Date of Patent: Oct. 21, 2014

(54) OPTICAL PARAMETRIC OSCILLATOR

(75) Inventors: John Barr, Edinburgh (GB); David Legge, Edinburgh (GB); John R. MacLean, Edinburgh (GB); Daniel H. Thorne, Edinburgh (GB); Jonathan Truby, Edinburgh (GB)

(73) Assignee: Selex ES Ltd, Essex (GB)

( * ) Notice: Subject to any disclaimer, the term of this patent is extended or adjusted under 35 U.S.C. 154(b) by 19 days.

(21) Appl. No.: 12/517,713

(22) PCT Filed: Dec. 17, 2007

(86) PCT No.: PCT/EP2007/064033
§ 371 (c)(1),
(2), (4) Date: Jun. 4, 2009

(87) PCT Pub. No.: WO2008/074762
PCT Pub. Date: Jun. 26, 2008

(65) Prior Publication Data
US 2010/0079851 A1 Apr. 1, 2010

(30) Foreign Application Priority Data

Dec. 19, 2006 (EP) .................................... 06270106
Dec. 19, 2006 (GB) .................................... 0625258.9

(51) Int. Cl.
| G02F 1/35 | (2006.01) |
| G02F 2/02 | (2006.01) |
| G02B 26/08 | (2006.01) |
| G02F 1/29 | (2006.01) |
| G02B 17/04 | (2006.01) |
| G02B 27/02 | (2006.01) |
| G02F 1/39 | (2006.01) |

(52) U.S. Cl.
CPC ........................................ *G02F 1/39* (2013.01)
USPC ............................ 359/330; 359/298; 359/438

(58) Field of Classification Search
USPC .............. 359/290–292, 298, 328–330, 207.8, 359/211.1–211.5, 218.1, 219.1, 431, 438
See application file for complete search history.

(56) References Cited

U.S. PATENT DOCUMENTS

| 6,072,545 | A * | 6/2000 | Gribshaw et al. | ........... 348/756 |
| 6,647,033 | B1 * | 11/2003 | Smith et al. | ..................... 372/21 |
| 6,647,034 | B1 * | 11/2003 | Smith et al. | ..................... 372/21 |

(Continued)

FOREIGN PATENT DOCUMENTS

| EP | 0 805 357 | 11/1997 |
| EP | 1 622 623 A1 | 5/2006 |
| GB | 1 358 023 | 8/1973 |

OTHER PUBLICATIONS

International Search Report (PCT/ISA/210) dated Jun. 3, 2008.

(Continued)

*Primary Examiner* — Thomas K Pham
*Assistant Examiner* — Brandi Thomas
(74) *Attorney, Agent, or Firm* — Buchanan Ingersoll & Rooney PC

(57) ABSTRACT

The present invention relates to an optical parametric oscillator. In particular, the present invention relates to a more optimal rotating image optical parametric oscillator. More specifically, there is described an optical parametric oscillator comprising six mirrored surfaces; wherein two of the mirrored surfaces are provided by a penta prism and the sequence of mirrors is operable to provide a predetermined rotation of a beam passing therethrough.

13 Claims, 6 Drawing Sheets

(56) References Cited

U.S. PATENT DOCUMENTS

| | | |
|---|---|---|
| 6,775,054 B1 | 8/2004 | Smith et al. |
| 2003/0128732 A1 | 7/2003 | Ishizu |
| 2006/0114962 A1 | 6/2006 | Ishizu |
| 2008/0013588 A1 | 1/2008 | Ishizu |
| 2008/0101429 A1* | 5/2008 | Sipes .................. 372/50.12 |

OTHER PUBLICATIONS

Armstrong et al., "High-Efficiency High-Energy Wavelength-Doubling Optical Parametric Oscillator" Proceedings of Spie—The International Society for Optical Engineering, 2006, vol. 6103, XP-002433945.

Smith et al., "Nanosecond Optical Parametric Oscillator with 90° Image Rotation: Design and Performance" Journal of the Optical Society of America, 2002, vol. 19, No. 8, pp. 1801-1814, XP-002433946.

Smith et al., "Image-Rotating Cavity Designs for Improved Beam Quality in Nanosecond Optical Parametric Oscillators" Journal of the Optical Society of America, 2001, vol. 18, No. 5, pp. 706-713, XP-002433944.

United Kingdom Search Report in Application No. GB0625258.9 dated Apr. 2, 2007.

Gould et al., "Crossed Roof Prism Interferometer" Applied Optics, 1962, vol. 1, No. 4, pp. 533-534.

Paxton et al., "Ray Matrix Method for the Analysis of Optical Resonators with Image Rotation" SPIE vol. 554 International Lens Design Conference, 1985, pp. 159-163.

* cited by examiner

OPTICAL PARAMETRIC OSCILLATOR

FIELD

The present invention relates to an optical parametric oscillator. In particular, the present invention relates to a more optimal rotating image optical parametric oscillator with plane mirrors to achieve improved reliability.

BACKGROUND

Laser designs have been developed for extreme environments, where large temperature excursions and high vibration levels are common. Typically, these use specialised laser resonators that are insensitive to movement of optical components such as mirrors or prisms. Examples of this type of solution are linear resonators terminated by Porro prisms, known as crossed Porro resonators. Crossed Porro resonators are commonly used in military applications where stability is more important than beam quality and have been reported as early as 1962 (G. Gould, S. F. Jacobs, P. Rabinowitz, and T. Schultz, "crossed roof prism interferometer", Applied Optics 1 533-534 (1962)) and the subject of patents (for example GB1358023, 1973-08-14). An important feature of this type of resonator is that it is perturbation stable in the sense that small movements of the prisms causes a small pointing change of the laser but do not cause distortion of the laser mode or pulse energy reduction. The crossed Porro resonator is an example of a more general class of optical structures comprising 4 or more reflecting surfaces with at least one out of plane reflection so that, on each round trip, the laser mode is rotated by an angle >0 degrees and <360 degree. Rotations on each round trip of 90 degrees and 180 degrees (characteristic of the standard crossed Porro resonator) are of particular importance. The general analytical techniques suitable to understand image rotation designs and an application to an unstable resonator is contained in A. H. Paxton, W. P. Latham, "Ray matrix method for the analysis of optical resonators with image rotation", SPIE 554 159-163 (1985). By comparison, the conventional Fabry-Perot resonator is not stable to small movements of the mirrors which significantly alter boresight, divergence and pulse energy.

Optical parametric oscillators are used to convert the output wavelength of a laser into a more useful range. FIG. 1 shows the simplest possible optical parametric oscillator 110 using a Fabry-Perot or linear resonator. The optical parametric oscillator is pumped by laser 110 producing nanosecond pulses of intense coherent light at, for example, 1064 nm. A non-linear crystal 140, such as Potassium Titanyl Phosphate (KTP), converts the pump light 120 into two longer wavelengths and provides parametric gain. A singly resonant optical parametric oscillator 100 ensures that one of these two wavelengths undergoes multiple reflections within the resonator. The input mirror 130 is highly transmissive at the pump wavelength and highly reflective at the circulating wavelength (known as the signal). The resonator is terminated by the output mirror 150 which is partially reflective at the signal wavelength. It can either be transmissive at the pump wavelength or highly reflecting at the pump wavelength. The latter choice is often made to improve the efficiency of the optical parametric oscillator 100, but needs additional components to prevent retro reflections into the pump laser 110. The Fabry-Perot resonator is unsatisfactory because small changes in mirror angle cause significant boresight, divergence and pulse energy changes.

Alternative plane mirror optical parametric oscillator configurations have been used shown in FIGS. 2 and 3. Here, a planar ring geometry is used to remove the efficiency concern associated with Fabry-Perot resonators by avoiding the retro reflections into the pump laser 210, 305. FIG. 2 shows a ring optical parametric oscillator 200 where the input mirror 225 is highly transmissive at the pump wavelength and highly reflective at the signal wavelength. The output coupler 235 is highly reflective at the pump wavelength and partially reflective at the signal wavelength. The two fold mirrors 245 are highly reflective at the signal wavelength and highly transmissive at the pump wavelength. A pair of alignment wedges 240 is used to ensure that the resonator is aligned correctly. FIG. 3 is an alternative arrangement, similar to FIG. 2, where additional non-linear crystals 340 are inserted within the other leg of the optical parametric oscillator 300 for reasons of efficiency or packaging. In this case fold mirror 1 335 is highly reflective at both the pump wavelength and the signal wavelength while fold mirror 2 350 is highly reflective at the signal wavelength but highly transmissive at the pump wavelength.

Both optical parametric oscillator 200, 300 layouts shown in FIG. 2 and FIG. 3 are sensitive to small mirror misalignments resulting in boresight, divergence and pulse energy changes. Further, the design shown in FIG. 3 has a manufacturing issue with fold mirror 1 335 where the thick coating required to achieve high reflectivity at both the pump wavelength and the signal wavelength is prone to de-laminate and has a relatively low laser damage threshold.

The obvious choice is to apply the principles of the out of plane resonator to a ring optical parametric oscillator. Various existing designs have been described in the literature including an image rotating 4 mirror ring optical parametric oscillator (U.S. Pat. No. 6,775,054), a ring oscillator incorporating a dove prism, and a crossed Porro design (for the latter two designs, see "Image rotating designs for improved beam quality in nanosecond optical parametric oscillators, A. V Smith, M. S. Bowers, J. Opt. Soc. Am B18 706-713 (2001)). These designs do not avoid the issues with mirror coatings noted above and are generally not compatible with our space requirements.

It is thus an aim of the present invention to mitigate the problems associated with the known designs described above.

SUMMARY

Accordingly, the present invention provides an optical parametric oscillator comprising six mirrored surfaces; wherein two of the mirrored surfaces are provided by a penta prism and the sequence of mirrors is operable to provide a predetermined rotation of a beam passing therethrough.

The optical parametric oscillator according to the invention includes a six mirror rotating image device which improves signal beam homogeneity in the near- and far-field, due to enhanced diffractive coupling between signal and pump beams; reduces boresight sensitivity to mirror movement; facilitates simpler alignment of the device; relaxes the requirements on mirror alignment tolerances and coating performance; and allows out of plane beam deviations to be minimised thereby allowing the dimensions of the device to be minimised for a given pump beam size.

BRIEF DESCRIPTION OF THE DRAWINGS

Specific embodiments of the invention will now be described, by way of example only and with reference to the accompanying drawings that have like reference numerals, wherein.

DETAILED DESCRIPTION

Figure 1:
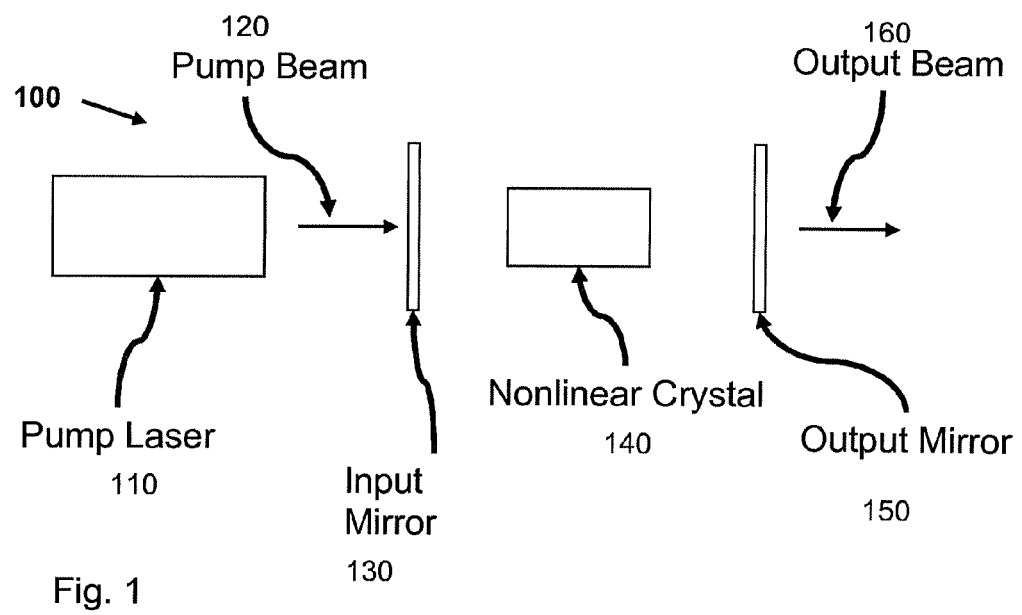
FIG. 1 shows the known simplest possible optical parametric oscillator using a Fabry-Perot or linear resonator.
Figure 2:
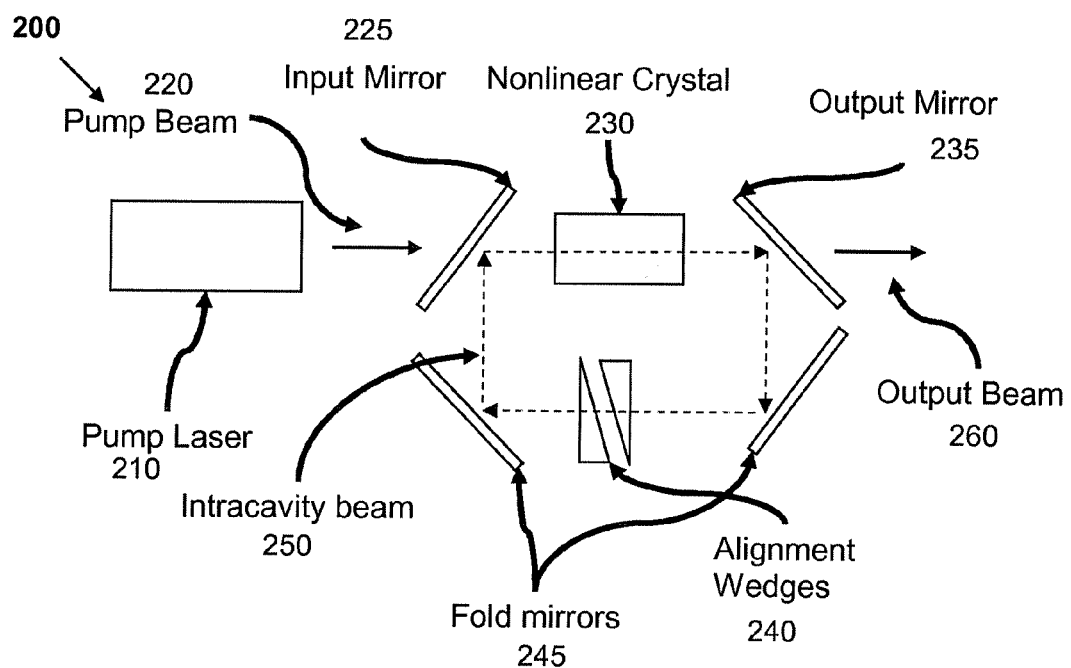
FIG. 2 shows a known ring optical parametric oscillator where the input mirror is highly transmissive at the pump wavelength and highly reflective at the signal wavelength.
Figure 3:
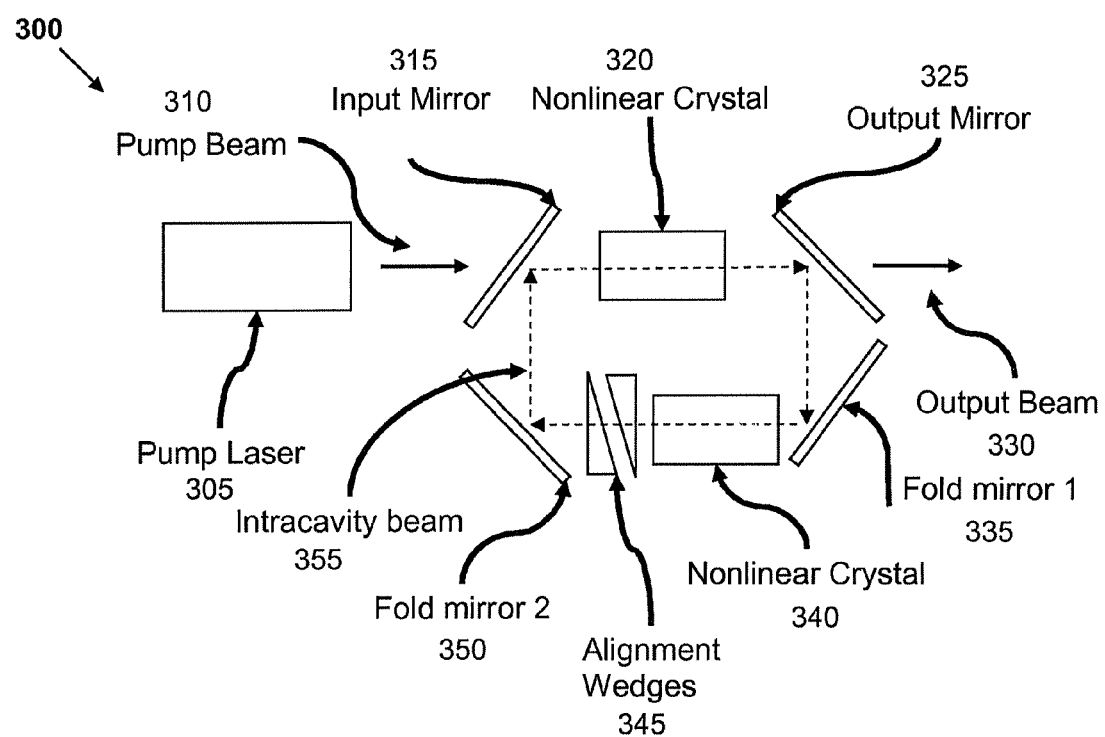
FIG. 3 is an alternative known arrangement, similar to FIG. 2, where additional non-linear crystals are inserted within the other leg of the optical parametric oscillator for reasons of efficiency or packaging.
Figure 4:
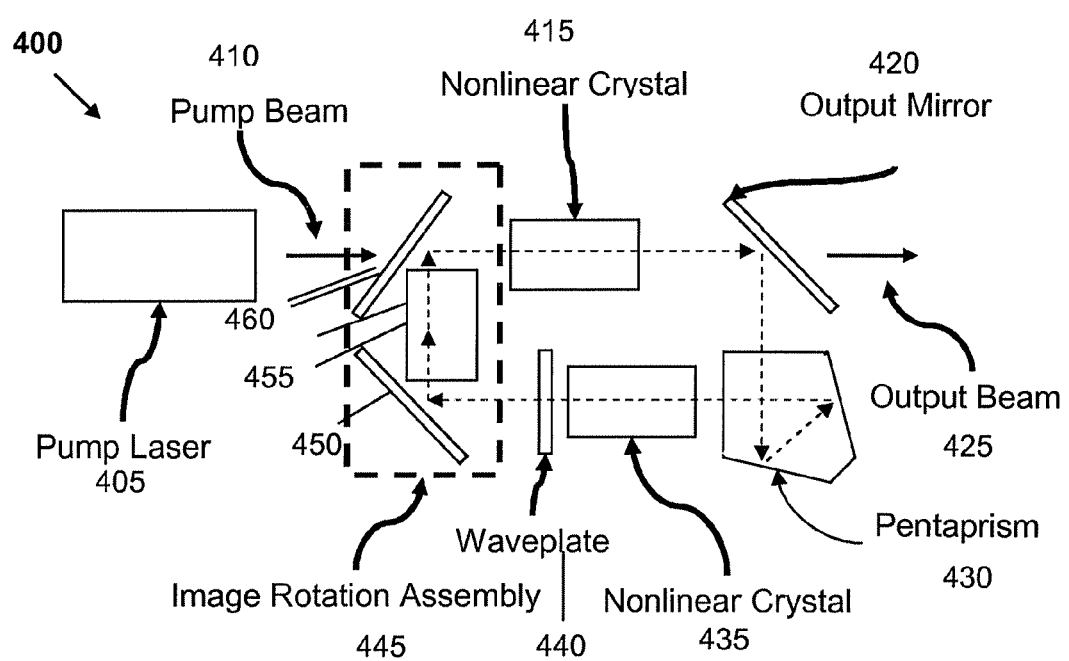
FIG. 4 is a diagram showing a design of rotating image optical parametric oscillator according to one embodiment of the present invention.

A specific embodiment of the present invention as shown in FIG. 4 will now be described:

A six mirror rotating image device is provided that incorporates a specific placement of non-linear crystals 415, 435, as shown in FIG. 4. There is an input mirror 460 that is part of the highlighted image rotation assembly 445 that is highly transmitting at the pump wavelength and highly reflecting at the signal wavelength. The output mirror 420 is highly reflecting at the pump wavelength and partially transmitting at the signal wavelength. The penta prism 430 is coated to provide high reflectivity at both the pump and signal wavelengths. These coatings are readily available and avoid the known issues with de-lamination and relatively low laser damage threshold referred to earlier. The penta prism 430 also provides two reflections which contribute to achieving a 90 degree image rotation on each pass. A waveplate 440 is provided to provide polarisation correction for the polarisation that results from the image rotation assembly 445. There are no adjustment wedges in this embodiment. The manufacturing tolerances and mirror mounting techniques allow the optical parametric oscillator 400 to be assembled without alignment to achieve full performance.

Figure 5:
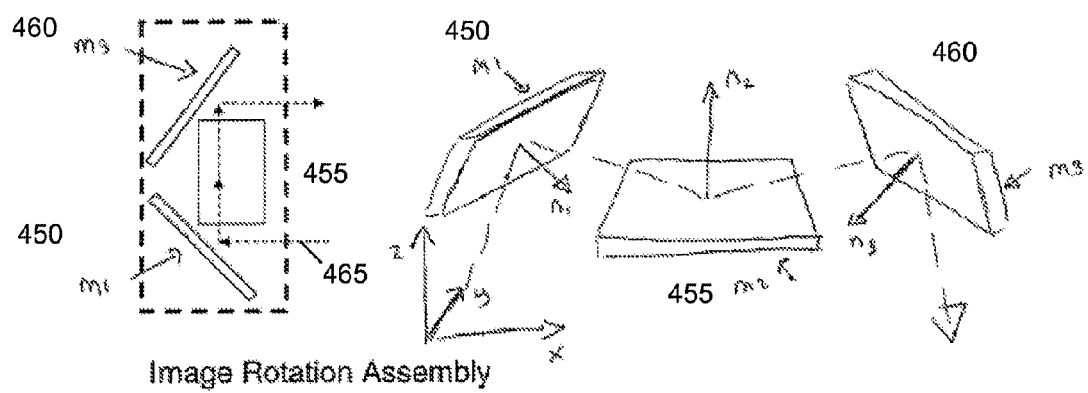
FIG. 5 is a diagram showing a design of a three mirror assembly that contributes to a 90 degree round trip image rotation according to one embodiment of the present invention.

The image rotation assembly 445 is made up of three mirrors 450, 455, 460 arranged as shown in FIG. 5. The normal to mirror M1 450 is $n1=(1/2,-1/2,-1/\sqrt{2})$; the normal to mirror M2 455 is $n2=(0,0,1)$; and the normal to mirror M3 460 is $n3=(-1/2,-1/2,-1/\sqrt{2})$; all components are defined relative to the right handed co-ordinate system (x,y,z) where y points in the direction of the signal beam 465, x points across the width of the optical parametric oscillator 400, and z is up. The recipe disclosed here contributes to a 90 degree image rotation on each round trip. Other image rotations are possible by changing the angles of the mirrors. A 180 degree image rotation would require the three mirror normals to be mutually perpendicular, for example, the normal to mirror M1 450 to be $n1=(1/\sqrt{2},-1/\sqrt{3},-1/\sqrt{6})$; the normal to mirror M2 455 to be $n2=(0,-1/3,\sqrt{2}/\sqrt{3})$; and the normal to mirror M3 460 to be $n3=(-1/\sqrt{2},-1/\sqrt{3},-1/\sqrt{6})$. Further, the out of plane direction could be down (as shown in FIG. 5) or alternatively up, without changing the essence of the invention.

Figure 6:
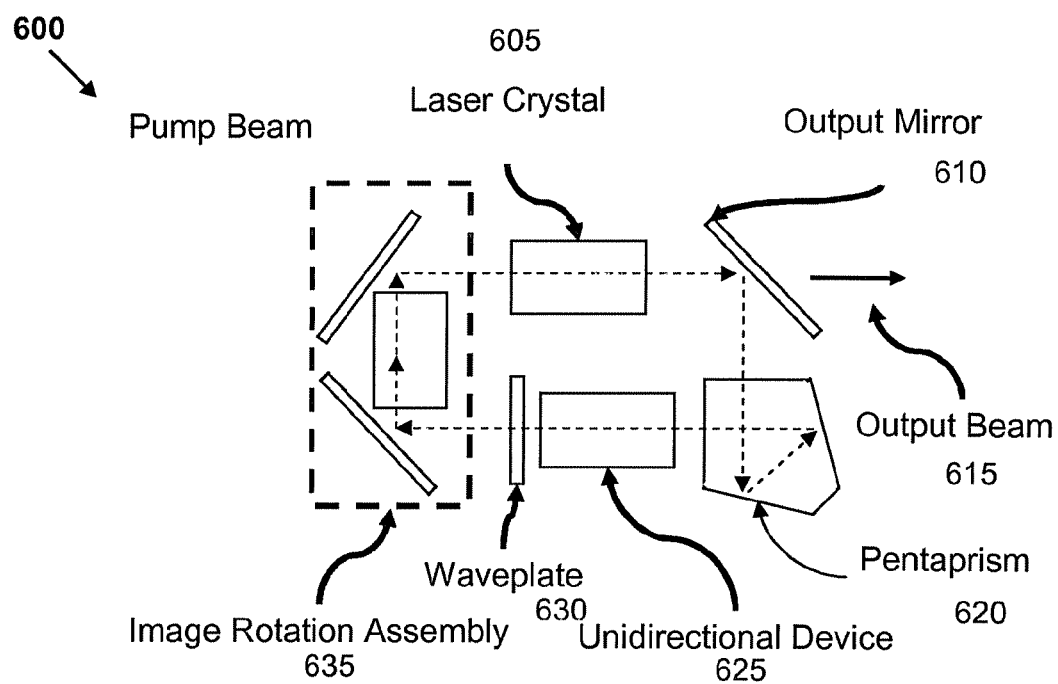
FIG. 6 shows an exemplary laser resonator configuration.

The advantages associated with this embodiment of the present invention are: spatial averaging of the signal beam providing a more uniform near field and far field when compared with non image rotating plane mirror optical parametric oscillator; the boresight sensitivity is reduced by a factor of 4-8×; there is always a well-defined optic axis that supports a uniform beam distribution; the boresight is only dependent on mirror angle and not translation; and active alignment of the optical parametric oscillator is not required provided that the angular position of the mirrors is controlled within easily met mechanical limits. Further, the six mirror design allows the achievement of a substantially rectangular shape for the packaged optical parametric oscillator 400 which allows increased flexibility. Increasing the number of non-linear crystals 415, 435 within either leg can be accommodated by a length change without altering the width or height of the package. Finally, the six mirror resonator design may be applied to other laser systems, not just optical parametric oscillators. FIG. 6 shows a six mirror laser resonator 600 where a gain material 605 and a unidirectional device 625 are used.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical parametric oscillator comprising:
   six mirrored surfaces including an image rotation assembly, an output mirror, and a penta prism,
   wherein three of the six mirror surfaces are provided by the image rotation assembly, which includes an input mirror having high transmissivity at a pump wavelength for passing a beam, and
   wherein the penta prism provides two of the six mirrored surfaces and directs light received from the output mirror to the image rotation assembly, the sequence of mirrors being operable to provide a predetermined rotation of a beam passing therethrough.

2. An optical parametric oscillator according to claim 1, wherein the input mirror of the three mirror image rotation assembly has high reflectivity at a signal wavelength; and
   wherein one of the mirrored surfaces comprises an output mirror having high reflectivity at the pump wavelength and an intermediate transmissivity at the signal wavelength.

3. An optical parametric oscillator according to claim 1 wherein the said rotation is through 90°.

4. An optical parametric oscillator according to claim 1 wherein the said rotation is through 180°.

5. An optical parametric oscillator according to claim 1 comprising:
   a waveplate.

6. An optical parametric oscillator according to claim 1 comprising:
   one or more non-linear crystals.

7. An optical parametric oscillator according to claim 2 wherein the said rotation is through 90°.

8. An optical parametric oscillator according to claim 2 wherein the said rotation is through 180°.

9. An optical parametric oscillator according to claim 8 comprising:
   a waveplate.

10. An optical parametric oscillator according to claim 9 comprising:
    one or more non-linear crystals.

11. The optical parametric oscillator according to claim 1, wherein a normal of each mirror in the three mirror image rotation assembly is adjustable to achieve a specified image rotation angle.

12. A six mirror resonator comprising:

six mirrored including an image rotation assembly, a penta prism, and an output mirror, wherein three of the mirrored surfaces are provided by the image rotation assembly and two of the mirrored surfaces are provided by the penta prism, which is configured to direct light received from the output mirror to the image rotation assembly, the sequence of mirrors being operable to provide a predetermined rotation of a beam passing therethrough, wherein the image rotation assembly comprises an input mirror of the resonator, the input mirror having high transmissivity at a pump wavelength.

13. The optical parametric oscillator according to claim 1, wherein a normal of each mirror in the three mirror image rotation assembly is adjustable to achieve a specified image rotation angle.

* * * * *